US006774980B2

(12) United States Patent
Hoshino et al.

(10) Patent No.: US 6,774,980 B2
(45) Date of Patent: Aug. 10, 2004

(54) PHOTOGRAPHIC IMAGE PRINT SYSTEM, PHOTOGRAPHIC IMAGE PRINTER, AND COMPUTER-READABLE RECORDING MEDIUM HAVING PHOTOGRAPHIC IMAGE PRINT PROGRAM STORED THEREON

(75) Inventors: Masaru Hoshino, Nagano (JP); Isao Edatsune, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/241,574

(22) Filed: Sep. 12, 2002

(65) Prior Publication Data

US 2003/0007188 A1 Jan. 9, 2003

Related U.S. Application Data

(63) Continuation of application No. 09/441,069, filed on Nov. 16, 1999, now Pat. No. 6,469,770, which is a continuation of application No. PCT/JP99/01299, filed on Mar. 16, 1999.

(30) Foreign Application Priority Data

Mar. 16, 1998 (JP) ........................................ P. 10-064874

(51) Int. Cl.[7] ........................... G03B 27/52; H04N 1/23
(52) U.S. Cl. ........................................ 355/40; 358/296
(58) Field of Search .............................. 355/38, 40–41, 355/54, 77; 396/319, 429, 564; 382/284, 305; 358/296

(56) References Cited

U.S. PATENT DOCUMENTS

| 5,488,558 A | 1/1996 | Ohki |
| 5,552,824 A | 9/1996 | DeAngelis et al. |
| 5,706,097 A | 1/1998 | Schelling et al. |
| 5,829,044 A | 10/1998 | Sono |
| 6,157,747 A | 12/2000 | Szeliski et al. |
| 6,298,405 B1 | 10/2001 | Ito et al. |
| 6,453,078 B2 * | 9/2002 | Bubie et al. ................. 382/305 |

FOREIGN PATENT DOCUMENTS

| JP | 05-122478 | 5/1993 |
| JP | 6-164812 | 6/1994 |
| JP | 7-143426 | 6/1995 |
| JP | 8-2020 | 1/1996 |
| JP | 8-79678 | 3/1996 |
| JP | 8-142441 | 6/1996 |
| JP | 8-307589 | 11/1996 |
| JP | 9-149352 | 6/1997 |

* cited by examiner

*Primary Examiner*—Henry Hung Nguyen
(74) *Attorney, Agent, or Firm*—Sughrue Mion, PLLC

(57) ABSTRACT

A photographic image print system, a photographic image printer, and a computer-readable storage medium having a photgraphic image print program stored thereon are provided to enable printing of pictures through a simple operation, as well as simplification of the printing operation itself, e.g., by avoiding repetitions of identical operations which would otherwise be continuously performed.

25 Claims, 14 Drawing Sheets

FIG. 12

| TOTAL OF AUTOMATIC SETTING | (NAMES OF BUTTONS) : | DEFAULT | | | | |
|---|---|---|---|---|---|---|
| VOICE GUIDE | SOURCE | INDEX | METHOD OF SELECTING PICTURE | DEFAULT NUMBER OF PRINTS | SIZE | ACKNOWLEDGEMENT OF PRINT |
| ○ SELECT | ○ SELECT | ○ SELECT | ○ SELECT | ⦿ SINGLE PRINTS | ○ SELECT | ○ NECESSARY |
| ○ NECESSARY | ⦿ MEMORY CARD | ○ EXECUTE | ⦿ ALL | ○ DOUBLE PRINTS | ⦿ DESIGNATE PAPER | ⦿ NOT NECESSARY |
| ⦿ NOT NECESSARY | ○ FILE | ⦿ OMIT | ○ SELECT | ○ TRIPLE PRINTS | 4 x 6 PAPER | |
| | ○ SERIAL | | ○ DESIGNATE THE NUMBER OF PICTURES | ○ QUDRUPLE PRINTS | 4 x 6 SIZE | |
| | | | | ○ QUNITUPLE PRINTS | | |
| | | | | ○ NUMBER OF PRINTS [ 0 ] FOR EACH PICTURE | | |

OK — 98
CANCEL — 99

PHOTOGRAPHIC IMAGE PRINT SYSTEM, PHOTOGRAPHIC IMAGE PRINTER, AND COMPUTER-READABLE RECORDING MEDIUM HAVING PHOTOGRAPHIC IMAGE PRINT PROGRAM STORED THEREON

CROSS REFERENCE TO RELATED APPLICATIONS

This is a continuation application of application Ser. No. 09/441,069 filed on Nov. 16, 1999, which issued as U.S. Pat. No. 6,469,770 and the disclosure of which is incorporated herein by reference, and a continuation application of PCT/JP99/01299 filed on Mar. 16, 1999.

FIELD OF THE INVENTION

The present invention relates to a photographic image print system, a photographic image printer, and a computer-readable recording medium having a photographic image print program stored thereon, wherein a digital photographic image captured by a digital still camera is printed.

BACKGROUND

Printing of pictures photographed by an ordinary camera through use of a silver film has conventionally been carried out according to one of the following three primary methods. (1) Users bring exposed rolls of film to shops such as convenience stores. The rolls of film are then collected in a central laboratory for development and printing, and prints thereof are delivered to the shops. (2) An exposed roll of film is developed and printed at a photo shop (mini-laboratory) having dedicated equipment. (3) The user uses a camera which can produce a photograph substantially simultaneous with photography of an object.

According to methods (1) and (2), the user must bring a roll of film to a shop, and a period of time lapses until photographs of the film are printed. If the user desires extra copies of a photograph, he must produce prints of all pictures, reviews the prints, and ask the shop to produce extra copies of certain prints. According to method (3), extra copies of a photograph cannot be produced, and the cost per print is high. Further, the photograph produced according to method (3) is inferior in picture quality to methods (1) and (2).

It is also conceivable that the user himself owns dedicated equipment such as that described in connection with (2). Such equipment involves wet processing, wherein a photographic print paper exposed to light that has passed through a film is fed so as to pass through a development liquid, a fixing liquid, and a cleansing liquid. Since the equipment is bulky and expensive, individuals and small-scale business establishments rarely own such equipment.

Recently, a digital still camera—which converts light collected by a lens into digital data by means of an optical sensor, such as a charge-coupled device, and stores the digital data on a storage medium—has become inexpensive, of improved quality, and widely pervasive. The digital still camera is connected to a personal computer (hereinafter referred to simply as a "PC") by way of a cable or infrared communications means. Photographic data stored in the digital still camera are transferred to the PC, where the PC can acquire the photographic data. In some digital still cameras, photographic data are stored in a memory card which can be removed from the camera body. The memory card is inserted into a card slot incorporated in the PC or attached to the outside of the PC, directly or by way of an adapter, to thereby enable the PC to acquire photographic data. A sublimation type printer or an ink-jet type printer is connected to the PC that has acquired the photographic data, whereby photographs can be inexpensively produced at a small-scale business establishment or in the home.

However, in the case where a picture is printed while the PC is connected to the printer, image processing software, which has conventionally been employed, is usually used. Before printing of a picture, there must be performed complicated operations: i.e., designation of the address of the file containing photographic image data desired to be printed; opening of the film; entry of an instruction byway of a keyboard, and selection of a menu from pull-down menus. If a plurality of photographic images are to be printed, substantially identical operations must be repeated for each image.

SUMMARY OF THE INVENTION

Against the above-described backdrop, there exists demand for printing, through a simple operation, pictures photographed by a digital still camera,. Further, there also exists demand for printing pictures without involvement of repetitions of identical operations; i.e., simplification of printing operation.

The present invention has been conceived to solve the foregoing problems, and the object of the present invention is to provide a photographic image print system, a photographic image printer, and a computer-readable storage medium having a photographic image print program stored thereon, which enable selection and printing of pictures through simple operation. Another object of the present invention is to provide a photographic image print system, a photographic image printer, and a computer-readable storage medium having a photographic image print program stored thereon, which enable printing of pictures through simplified operation.

To achieve the objects, the present invention provides a photographic image print system comprising:

a reading section for reading photographic image data from a storage medium having photographic image data stored thereon;

an input section which enables pressing of an arbitrary position on a screen displayed on the display section;

a print section for printing pictures;

means for displaying, on the display section, a processing selection screen on which a plurality of processing selection buttons are displayed;

means for selecting processing by pressing of a processing selection button on the input section;

means for displaying a plurality of processing selection screens in predetermined sequence; and means for designating omission of display of at least one of the plurality of processing selection screens. Since it is possible to designate omission of display of at least one of the plurality of processing section screens, the user's operation is simplified.

Preferably, the photographic image print system comprises means for setting beforehand data to be selected on a plurality of processing selection screens. Since data to be selected are set beforehand on the processing selection screen, the necessity for repetitions of identical processing is eliminated when identical operation is continuously performed, thus simplifying operation.

Preferably, the photographic image print system provides, on the processing selection screen, at least choices of pictures to be printed, choices about the number of prints to be produced, and choices about the size of prints to be produced. For instance, so long as the print system is set beforehand such that single prints of all pictures are to be printed in predetermined sizes, predetermined pictures can be printed without involvement of selection on the processing selection screen, thus simplifying the photographic image printing operation.

In addition to the previously-described configurations, other best modes or modifications evident from the drawings may be applied to the photographic image print system according to the present invention.

According to another aspect of the present invention, there is provided a photographic image printer including a reading section for reading photographic image data from a storage medium having photographic image data stored thereon, a print section for printing a picture, and an input section for directing the details of processing, wherein when an instruction is input by way of predetermined input means of the input section, a predetermined picture stored in the storage medium is printed. Since a picture to be printed is determined by means of the input means used for directing a print operation, the picture can be printed through simple operation. Further, the user's print operation can be simplified.

Preferably, the predetermined input means corresponds to first input means for directing printing of all pictures stored in the storage medium. Since all the pictures can be printed by means of a direction input by way of the first input means, pictures can be printed through simple operation. Further, operation for printing a picture can be simplified.

Preferably, the predetermined input means further comprises second input means for directing printing of index images corresponding to the pictures stored in the storage medium. Since index images can be printed by means of a direction input by way of the second input means, index images can be printed through simple operation. Further, operation for printing index images can be simplified.

In addition to the previously-described configurations, other best modes or modifications evident from the drawings may be applied to the photographic image printer according to the present invention.

According to another aspect of the present invention, there is provided a computer-readable storage medium having a photographic image print program stored thereon, the program comprising:

a procedure for reading photographic image data from a storage medium in which photographic image data are stored;

a procedure for detecting a position on the screen of the display section pressed by way of an input section;

a procedure for printing the photographic image;

a procedure for displaying, on a display section, a processing selection screen on which a plurality of processing selection buttons are to be displayed;

a procedure for selecting the processing corresponding to the processing selection button pressed by way of the input section;

a procedure for displaying a plurality of processing selection screens in predetermined sequence; and a procedure for designating omission of display of at least one of the plurality of processing selection screens. Since the program can be set that display of at least one of the processing selection screens can be omitted, operation can be simplified.

Preferably, the storage medium includes a procedure for setting, beforehand, data to be selected on the plurality of processing selection screens. A necessity for repetitions of identical selection is eliminated when identical operation is continuously performed, thus simplifying operation.

Preferably, the processing selection screen provides at least choices of pictures to be printed, choices about selection of the number of prints, and choices about the size of prints. For instance, so long as the program is set beforehand such that single prints of all the pictures are to be printed in predetermined size, predetermined images can be printed without involvement of selection of the processing selection screens, thus simplifying a photographic image printing operation.

In addition to the previously-described configurations, other best modes or modifications evident from the drawings may be applied to the computer-readable storage medium having a photographic image print program stored thereon.

BRIEF DESCRIPTION OF THE DRAWINGS

FIG. 12 shows a system setting screen according to the first embodiment;

BEST MODES FOR CARRYING OUT THE INVENTION

A plurality of embodiments of the present invention will be described in detail hereinbelow by reference to the drawings.

A. First Embodiment

Figure 2:
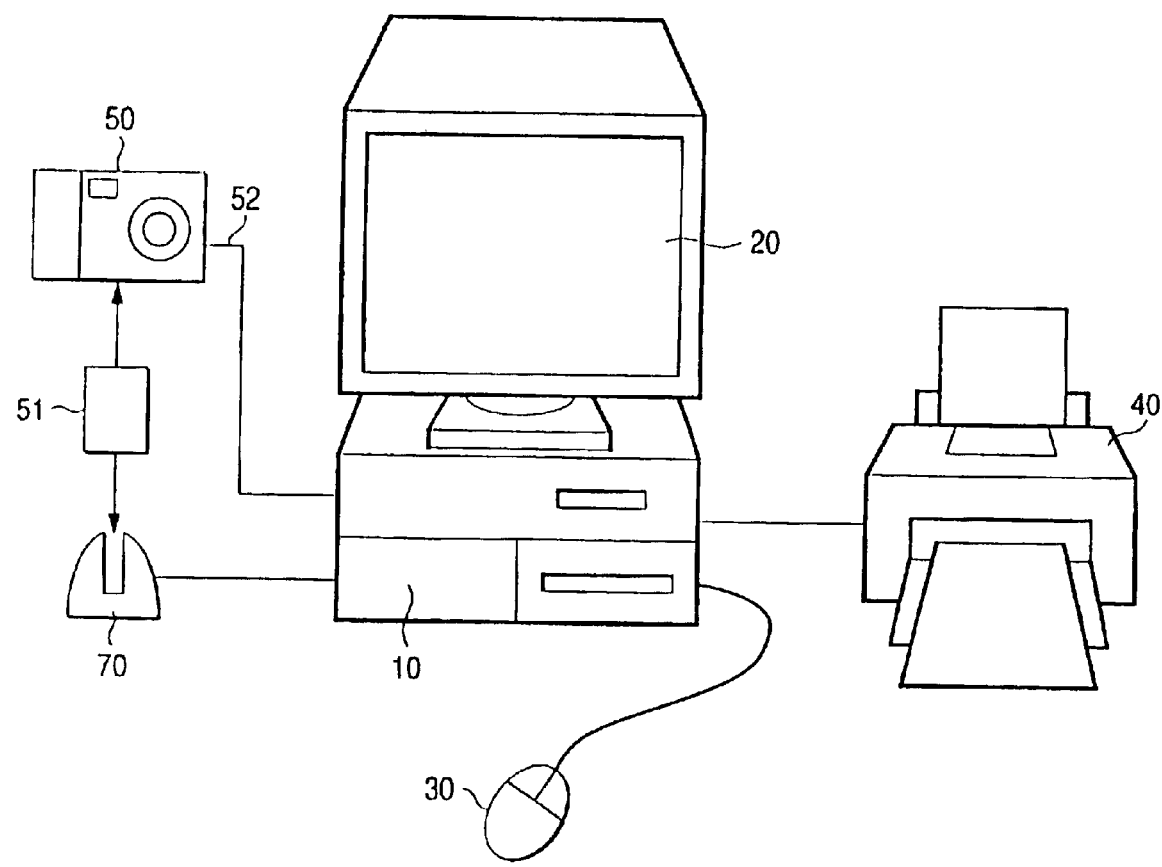
FIG. 2 is a block diagram schematically showing a photographic image print system according to the first embodiment.

As shown in FIG. 2, a photographic image print system according to a first embodiment of the present invention comprises a PC 10 serving as a control section; a monitor 20 which serves as a display section and is connected to the PC 10; a mouse 30 which serves as an input section and is connected to the PC 10; and a printer 40, such as an ink-jet printer, which serves as a print section. The PC 10 comprises a central processing unit (CPU), RAM serving as a primary storage device, and a hard disk drive serving as an auxiliary storage device. When a computer program for printing purpose installed in, e.g., the hard disk drive of the PC 10, is loaded, the PC 10 displays a photographic image on the monitor 20, permits the user to select an execution procedure by way of the mouse 30, and controls the printing of a photographic image by the printer 40. The computer program is available on a computer-readable storage medium, such as a floppy disk, CD-ROM, or a magneto-optic (MO) disk. The computer program is installed in the hard disk drive unit of the PC 10 and is read in the RAM. The thus-read program is executed by the CPU. Alternatively, a program may be provided over a network, such as the Internet, and stored in a location separated from a computer which performs the program.

A storage medium for storing photographic image data may be implemented in any one of the following three forms: (1) a memory card 51 removably attached to a digital still camera 50 is inserted into a card slot 71 formed in a card reader 70 housed in or attached to the outside of the PC 10; (2) the digital still camera 50 having internal memory is connected to the PC 10 by way of a serial cable 52 or a like cable, and the contents of the internal memory are read by the PC 10; and (3) a storage device, such as a floppy disk, a CD-ROM, MO, or the hard disk 13 is housed in or attached to the outside of the PC 10.

Figure 1:
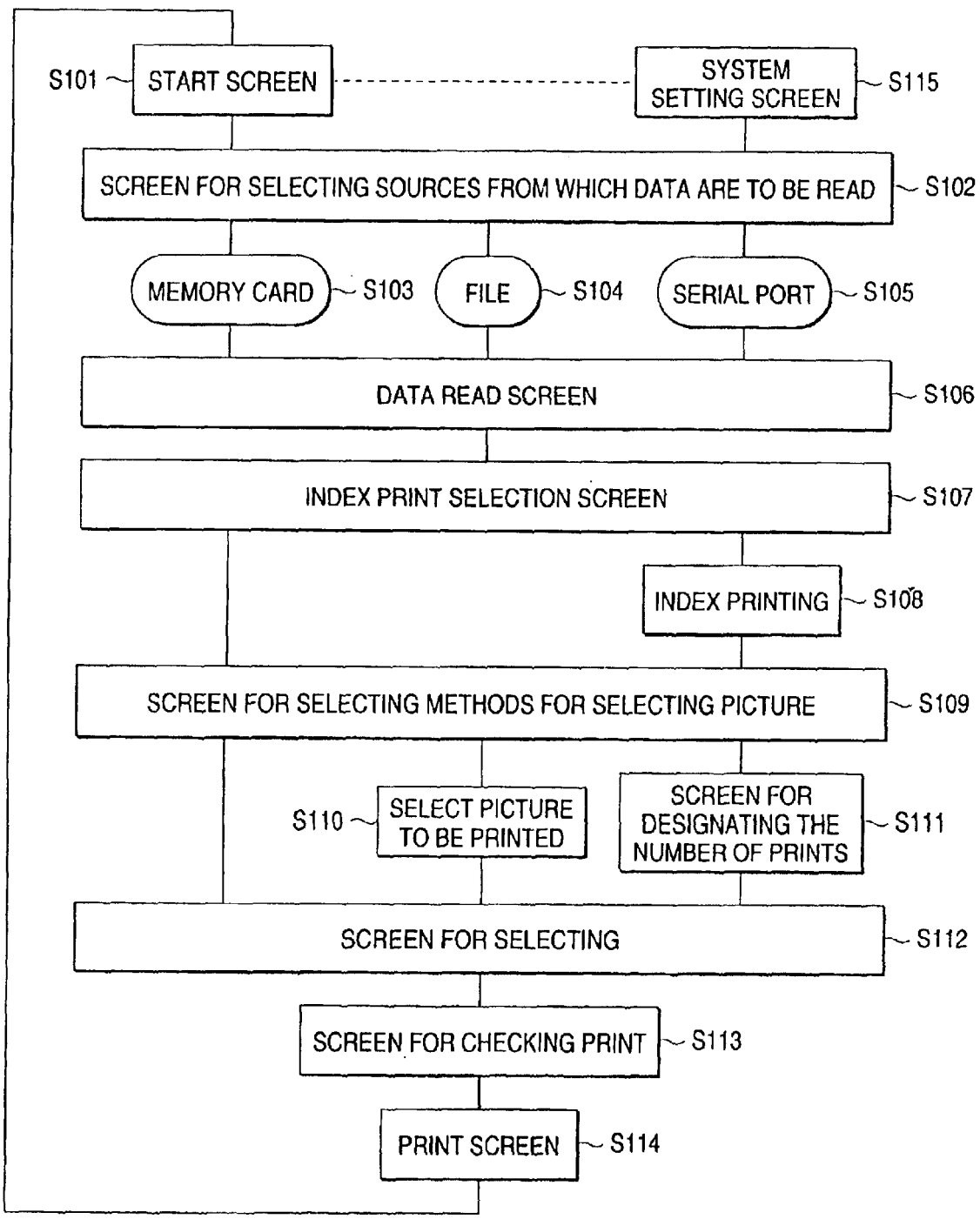
FIG. 1 is a flowchart showing procedures for printing pictures according to a first embodiment of the present invention.

Procedures for printing pictures through use of the photographic image print system according to the first embodiment will now be described. FIG. 1 is a flowchart showing procedures according to which the user instructs printing operations in the present embodiment.

Through use of the mouse 30, the user can freely change the position of an arrow-shaped pointer appearing on the monitor 20. After the pointer has been positioned over the appropriate image appearing on the monitor 20, the user "clicks" the icon to designate selection of the image.

Figure 3:
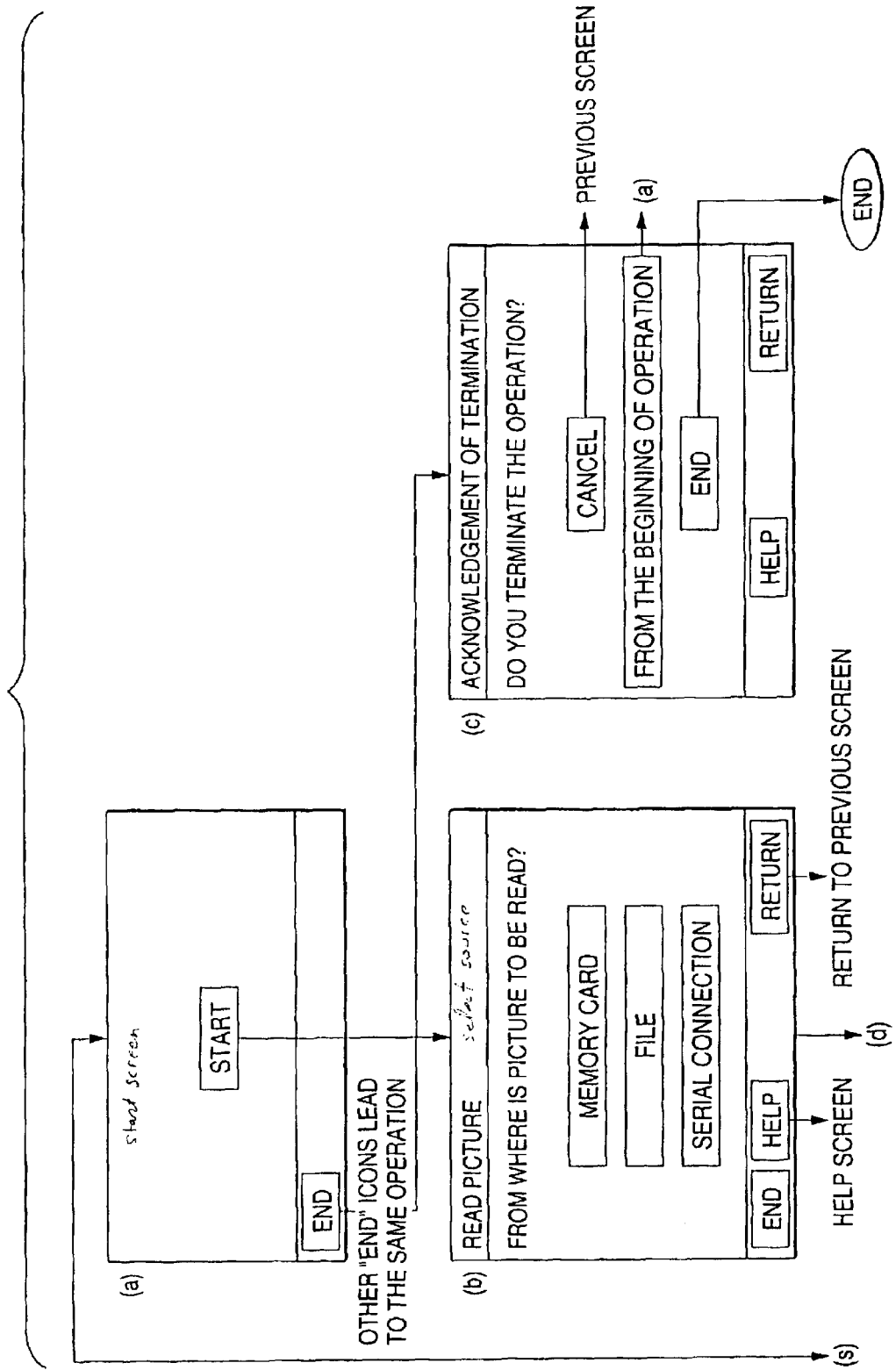
FIG. 3 shows screens to be displayed on a monitor according to the first embodiment.

When the print program according to the first embodiment is loaded, a start screen such as that shown in FIG. 3(*a*) appears (S101). Here, when the icon of a "START" button is clicked, as shown in FIG. 3(*b*) a screen for selecting a source from which photographic image data are read appears (S102). An icon of a "MEMORY CARD" button, an icon of a "FILE" button, and an icon of a "SERIAL CONNECTION" button are displayed as available choices.

When the "MEMORY CARD" button is clicked, the memory card 51 is specified as the source from which photographic image data are to be read (S103), and an instruction for inserting a memory card appears on the screen. When the "FILE" button is clicked, the source is selected from the storage device such as the hard disk of the PC 10 (S104). When the "SERIAL CONNECTION" button is clicked, the internal memory of the digital still camera 50 connected to the PC 10 by way of the serial cable 52 is taken as the source (S105). When the "SERIAL CONNECTION" button is clicked, there is loaded a program for reserving the photographic data stored in the internal memory of the digital still camera 50 into the hard disk drive of the PC 10. At this time, the hard disk drive of the PC 10 may be taken as the source.

When the icon of an "EXIT" button appearing on the screen shown in FIG. 3(*b*) is clicked, a termination acknowledgement screen such as that shown in FIG. 3(*c*) appears. When a "CANCEL" button appeared on the termination acknowledgement screen is clicked, the screen returns to the previous screen on which the "EXIT" button was clicked. When the icon of a "FROM THE BEGINNING OF OPERATION" button is clicked, the screen returns to the start screen. In contrast, when the icon of the "EXIT" button is clicked, the print program which is currently running is terminated.

When an icon of a "HELP" button appearing on the screen shown in FIG. 3(*b*) is clicked, a help screen for describing terms used in the current screen or operation methods appears. If the icon of the "RETURN" button is clicked, the immediately previous screen appears.

The "END," "HELP," and "RETURN" buttons are displayed on the screen at all times in the subsequent procedures, and they have the same functions as those described previously.

Figure 4:
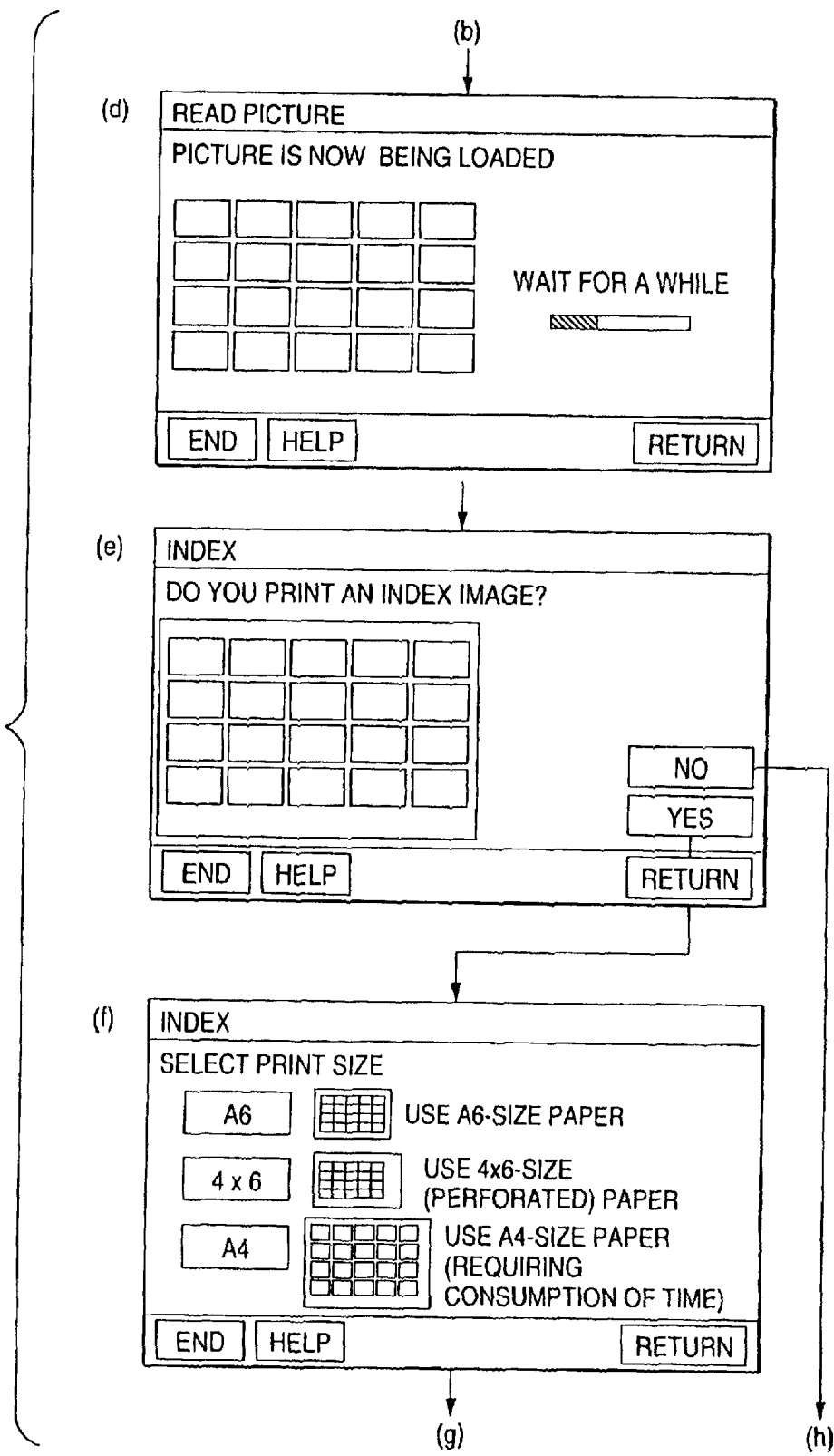
FIG. 4 shows screens to be displayed on the monitor according to the first embodiment.

When the source from which photographic image data are to be read is selected, photographic data are read from the storage medium designated as the source (S106). A plurality of thumbnail images are displayed as reduced images on the monitor 20 through use of reduced data pertaining to the pictures stored together with the photographic image data. During this procedure, there may be a case where only reduced data are read. If no reduced data exist, reduced data are prepared from the photographic image data and displayed. In the present embodiment, as shown in FIG. 4(*d*), 20 thumbnail images are represented on a single screen of the monitor 20.

Next, selection is made as to whether to produce index prints (S107). A screen such as that shown in FIG. 4(*e*) appears on the monitor 20. If the icon of the "NO" button is clicked, processing then proceeds to step S109 without index prints being produced. In contrast, if the icon of the "YES" button is clicked, a screen such as that shown in FIG. 4(*f*) appears on the monitor, on which the user is required to designate the size of an index print. The user click the icon of a button representing the paper size corresponding to the size of sheets loaded in the printer 40, whereby a screen such as that shown in FIG. 5(*g*) appears on the monitor. Consequently, there is performed index printing, wherein 20 thumbnail images are printed on each single sheet (S108).

In the present embodiment, any one of A4-size paper, 4×6 paper, or A6-size paper can be used. A4-size paper is cut so as to measure 210×297 mm, and 4×6 paper is cut so as to measure 114×175 mm. Four side edges of 4×6 paper are perforated. The paper is cut into 102×152 mm or substantially 4×6 inches, by tearing of the paper along the perforations. A6-size paper is cut so as to measure 105×148 mm. At the time of index printing, photo numbers, which represent a sequential order in which pictures are stored, are printed in the vicinity of the respective photographic images. If data pertaining to dates of photo shooting are included in the photographic image data, characters representing the dates may also be printed.

A method for selecting pictures desired to be printed is selected (S109). When the icon of an "ALL" button appearing on the screen shown in FIG. 5(*h*) is clicked, the print program is set such that single prints of all the pictures are produced, and processing then proceeds to step S112. When the user clicks the icon of the "SELECT" button, processing proceeds to step S110. If the user clicks the icon of the "SPECIFY THE NUMBER OF COPIES" button, processing proceeds to step S111.

Figure 5:
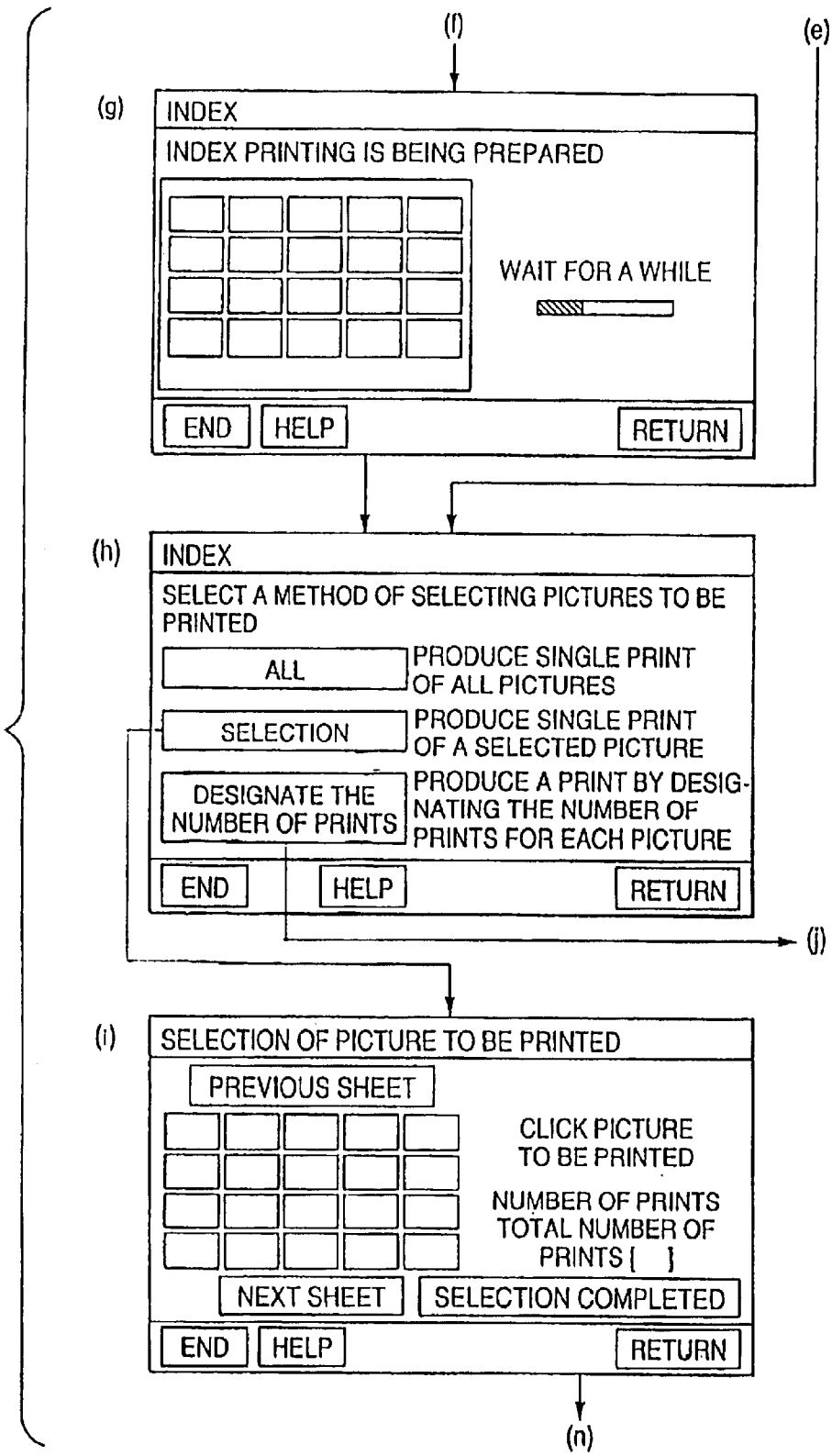
FIG. 5 shows screens to be displayed on the monitor according to the first embodiment.

In step S110, a screen such as that shown in FIG. 5(*i*) appears on the monitor. If the user clicks a certain thumbnail picture, the user can determine whether to produce a print of the picture. In step S110, the print program is set so as to produce no prints of the pictures. When the user clicks a thumbnail picture 201 desired to be printed, a symbol, such as a circle representing the thumbnail assigned the symbol, is indicated on the thumbnail picture 201. The print program is set such that a single print of a picture corresponding to the thumbnail picture 201 is produced. If the user again clicks the thumbnail picture assigned a circular symbol, the symbol disappears, and the designation for printing the thumbnail picture is canceled. The total number of prints is also indicated on the screen shown in FIG. 5(i).

Alternatively, the print program may be set at the outset such that single prints of all the pictures are produced and that a symbol, such as X representing that the corresponding thumbnail picture assigned the symbol is not printed, may be assigned to a thumbnail picture selected by the user by means of clicking.

If 20 or more pictures have already been stored in the memory card 51 and not all the thumbnail pictures of the pictures can be displayed on the monitor 20, the thumbnail pictures may be displayed while they are separated into several sheets, each including 20 thumbnail pictures. A "NEXT SHEET" button for displaying the next sheet and a "PREVIOUS SHEET" button for displaying the previous sheet appear on the monitor 20. The user can switch the sheet to be displayed by clicking either the "NEXT SHEET" button or the "PREVIOUS SHEET" button. When the user designates one or more pictures to be printed and clicks the icon of the "SELECTION COMPLETED" button, processing proceeds to step S112.

Figure 6:
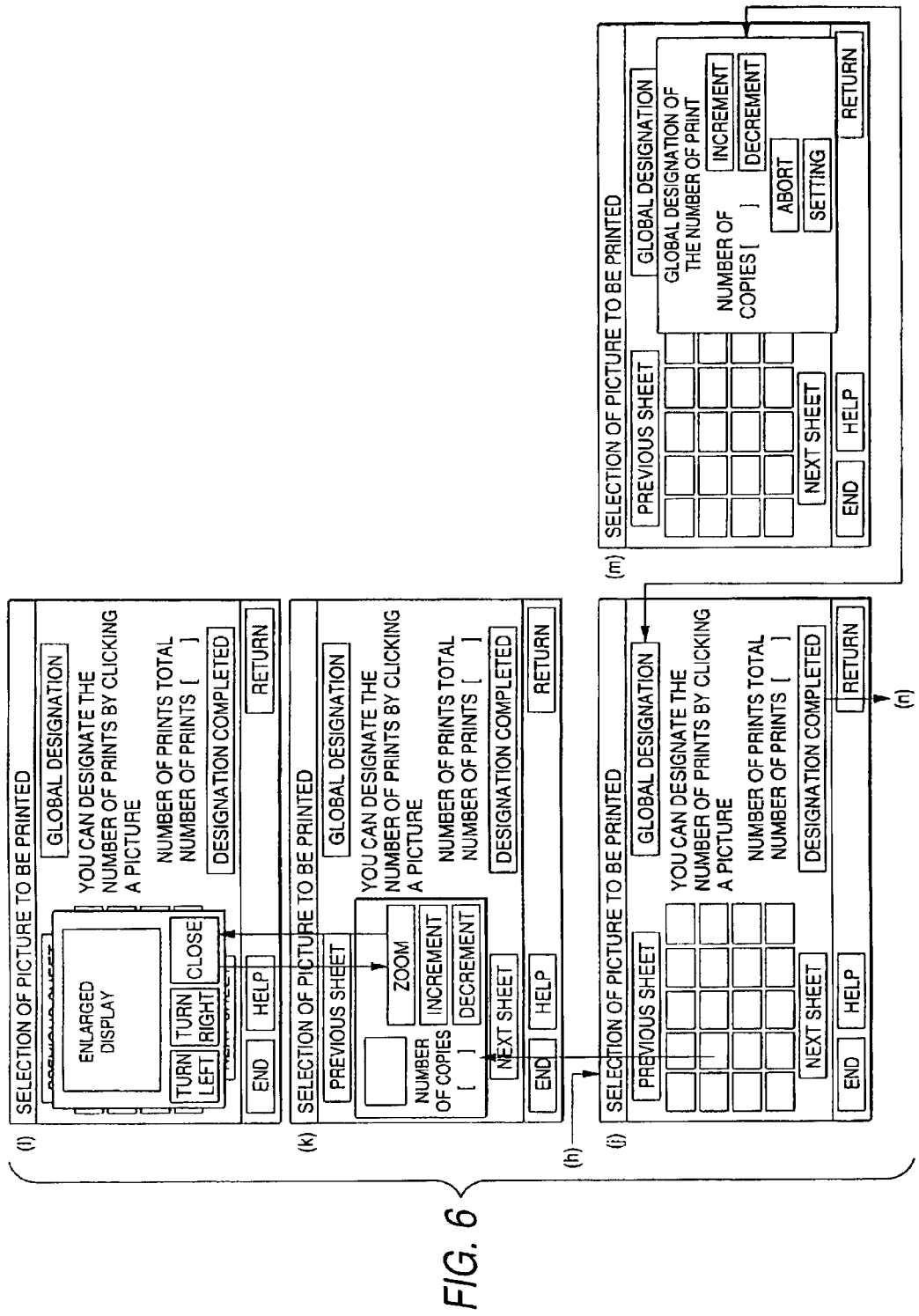
FIG. 6 shows screens to be displayed on the monitor according to the first embodiment.

In step S111, a screen such as that shown in FIG. 6(j) appears on the monitor. As in the case of the screen shown in FIG. 5(i) in connection with step S110, the previous sheet or the next sheet can be displayed. If the user clicks a thumbnail of a certain picture, the screen is switched to a screen such as that shown in FIG. 6(k). By clicking the "INCREMENT" button, the user can increase the number of prints of the thus-designated picture in increments of one. In contrast, by clicking the "DECREMENT" button, the user can decrease the number of prints of the picture in increments of one. If the thumbnail picture is again clicked, the screen returns to the screen shown in FIG. 6(j).

Further, if the "ZOOM" button is clicked, the screen is switched to a screen such as that shown in FIG. 6(l), whereby the thumbnail picture is enlarged so that the user can review the detail of the picture. Further, if the user clicks the "TURN LEFT" button or the "TURN RIGHT" button, the picture is rotated right or left through 90 degrees. If the "CLOSE" button is clicked, the screen returns to the screen shown in FIG. 6(k). The buttons "INCREMENT" and "DECREMENT" may be replaced with buttons "+" and "−" or buttons labeled with the shapes "UPWARD ARROW" and "DOWNWARD ARROW." Further, the "ZOOM" button may be replaced with a button labeled with the shape of a magnifying glass.

When the user clicks the "GLOBAL DESIGNATION" icon appearing on the screen shown in FIG. 6(j), the screen shown in FIG. 6(m) appears on the monitor, whereby the user can increase or decrease the number of prints in increments of one. When the user clicks the "SETTING" button appearing on the screen, all the pictures are printed in the same number of prints. If the user clicks the "ABORT" button, the number of prints returns to the number designated before the "GLOBAL DESIGNATION" button was clicked, and the screen returns to the screen shown in FIG. 6(j). Alternatively, after the number of prints of all the pictures has been set to a predetermined number on the screen shown in FIG. 6(m), the number of prints of the respective picture may be set on the screen shown in FIG. 6(k).

The total number of prints is also indicated on the screen shown in FIG. 6(j). When the user designates one or more pictures to be printed and clicks the "SELECTION COMPLETED" button, processing proceeds to step S112.

Figure 7:
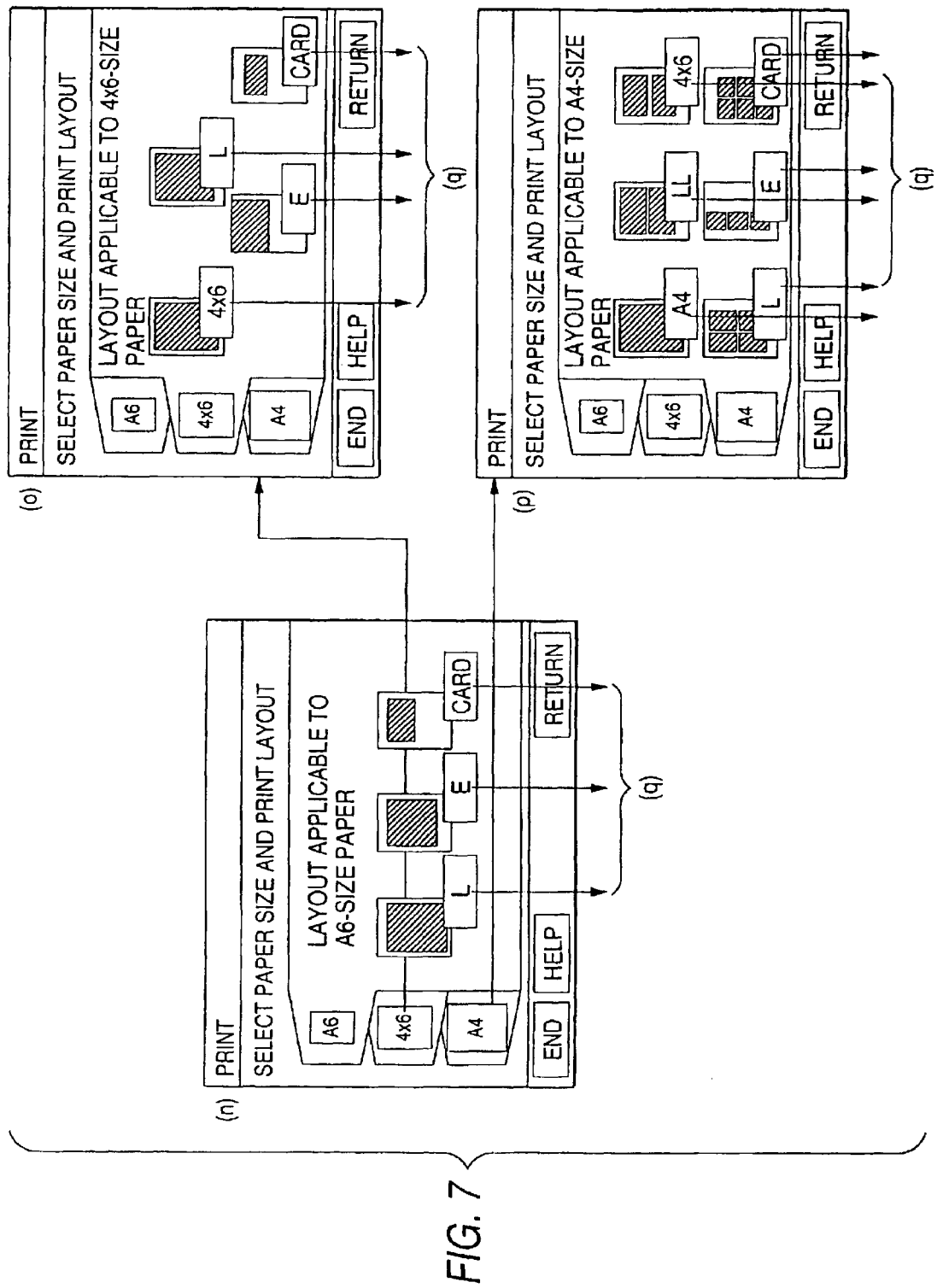
FIG. 7 shows screens to be displayed on the monitor according to the first embodiment.

In step S112, a screen such as that shown in FIG. 7(n) appears on the monitor 20, wherein the user selects the size of paper on which the pictures are to be printed. In the first embodiment, A4-size paper, 4×6-size paper, and A6-size paper are available as photo print paper, and the photographic image print system can produce prints of pictures in various sizes; i.e., a card size, size E, size L, size 4×6, and size LL.

Card-size measures 89×55 mm and is substantially equal in size to a commonly-used name card. In the present embodiment, the four sides of a print area of the paper are cut after printing, to thereby eliminate margins and create a card. To this end, the picture is printed in a size of 91×57 mm. The size of paper including the margins is called a "real print" size.

Size E measures 110×74 mm and is substantially equal to the size of a standard photograph in the past. Real print size measures 112×76 mm.

Size L measures 127×89 mm and is substantially equal to the size of a current standard photograph. Real print size measures 129×91 mm.

Size 4×6 measures 152×102 mm and is substantially equal to the size of a standard photograph produced in the U.S. or Europe. Real print size measures 154×104 mm.

Size LL measures 178×127 mm and is substantially equal to double size L. Real print size measures 180×129 mm.

Size A4 measures 254×178 mm and equals four times size L. Therefore, size A4 is also called size 4L. Real print size measures 256×180 mm.

When the user clicks a "4×6" tab appearing on a screen shown in FIG. 7(n) or 7(p), icons of a size 4×6 button, a size L button, a size E button, and a card size button, all of which enable printing of a picture on 4×6 paper, appear on the monitor. The user can select the desired print size by clicking the corresponding button. When a picture is printed in 4×6 size on the 4×6-size paper, the paper is cut along perforation, thereby producing a print having no margins.

When the user clicks a "A4" tab appearing on a screen shown in FIG. 7(n) or 7(o), icons of a size A4 button, a size LL button, a size 4×6 button, a size L button, a size E button, and a card size button, all of which enable printing of a picture on A4-size paper, appear on the monitor. The user can select the desired print size by clicking the corresponding button.

When the user clicks the "A4" tab appearing on a screen shown in FIG. 7(o) or 7(p), icons of a size A6 button, a size L button, a size E button, and a card size button, all of which enable printing of a picture on A6-size paper, appear on the monitor. The user can select the desired print size by clicking the corresponding button.

Icons, each representing the relationship between a paper size and a print area on the paper, are displayed as print size buttons on the screens shown in FIGS. 7(n), 7(o), and 7(p). As shown in FIG. 7(p), a single A4-size picture is laid out on A4-size paper; two LL-size pictures and 4×6-size pictures are laid out on respective sheets of A4-size paper; four L-size pictures are laid out on A4-size paper; three E-size pictures are laid out on A4-size paper; and eight card-size pictures are laid out on A4-size paper.

The photographic image print system may be set such that, when processing proceeds to step S112, the system enters a stat analogous to the state in which the icon of a tab corresponding to the paper size selected for index printing in step S107 is clicked. After print size has been selected, processing proceeds to step S113.

Figure 8:
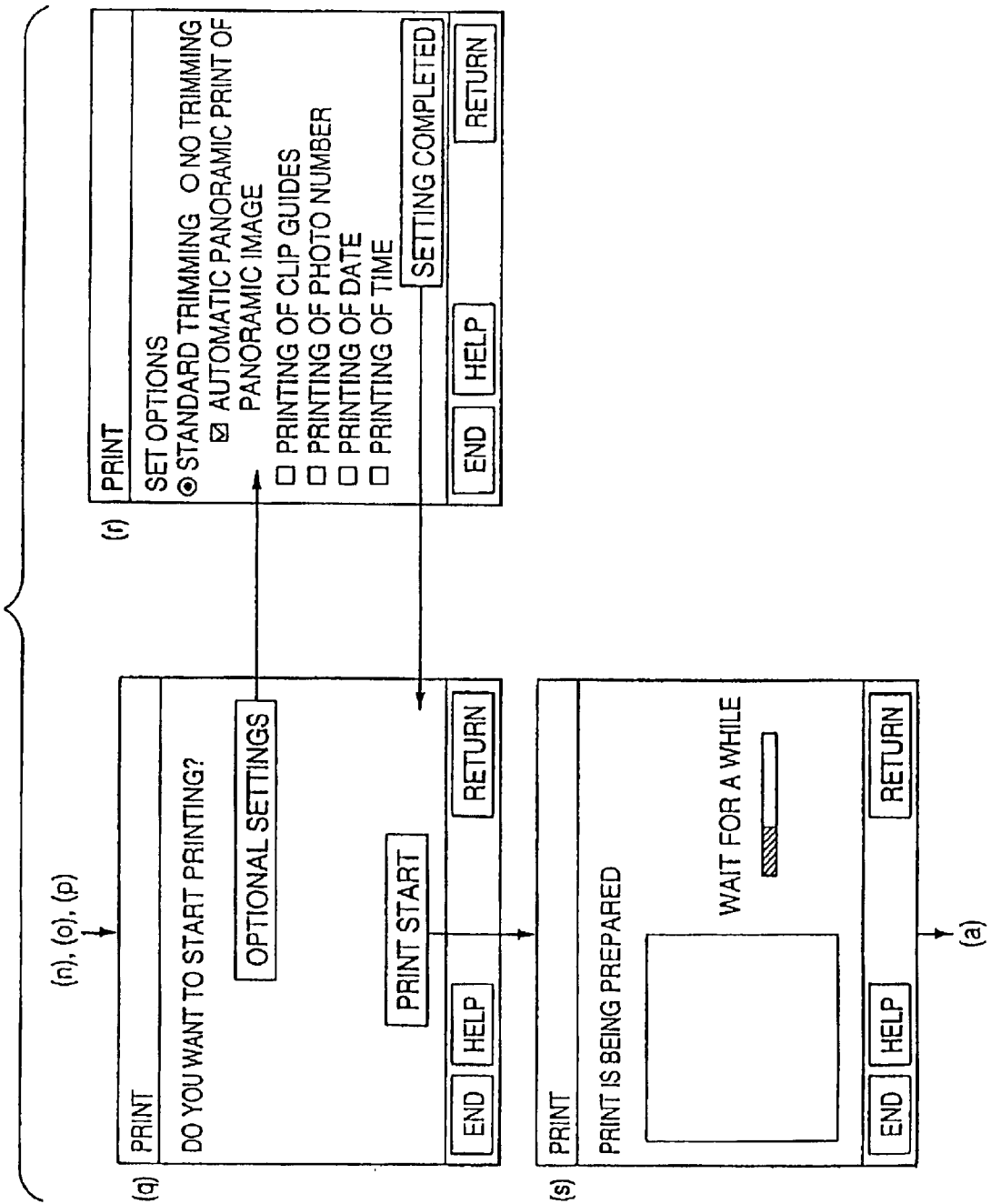
FIG. 8 shows screens to be displayed on the monitor according to the first embodiment.

In step S113, a screen such as that shown in FIG. 8(q) appears on the display. When the icon of the "PRINT START" button is clicked, processing proceeds to step S114. When the icon of the "OPTION SETTING" is clicked, a screen such as that shown in FIG. 8(r) appears on the display, wherein the user can set optional print settings.

A picture photographed by a common digital still camera comprises 640×480 pixels or 1024×768 pixels so as to assume an aspect ratio of 3:4. In contrast, commonly-used photo print sizes, such as size E or size L, have aspect ratios different from 3:4. In the first embodiment, when optional settings are not selected or when "STANDARD TRIMMING" appearing on the screen shown in FIG. 8(r) is selected, photographic image data (original data) are rotated such that the longer sides of the original data match the longer sides of the print area. If the aspect ratio of the original data is smaller than that of the print area (close to 1:1), the original data are printed such that the longer sides of the original data match the longer sides of the print area and the original data are vertically trimmed. In contrast, if the aspect ratio of the original data is greater than that of the print area, the original data are printed such that the shorter sides of the original data match the shorter sides of the print area and the original data are horizontally trimmed. In this way, margins can be prevented from arising in the print area.

Figure 9:
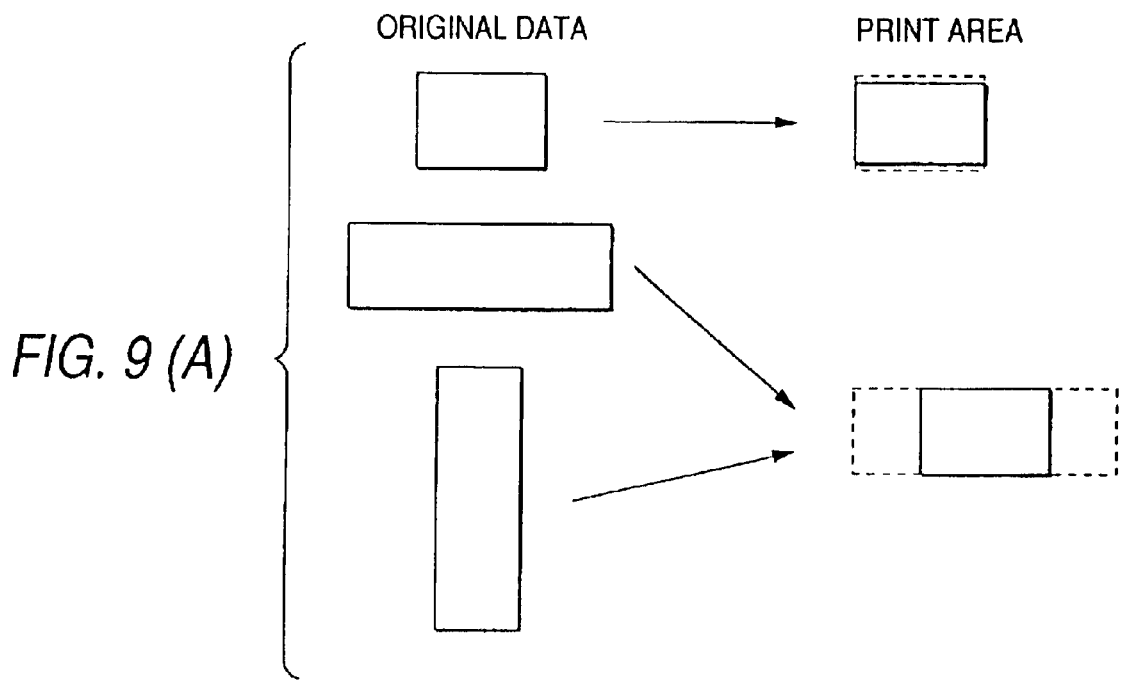
FIGS. 9a–c show descriptive views for describing trimming of an image.
Figure 9:
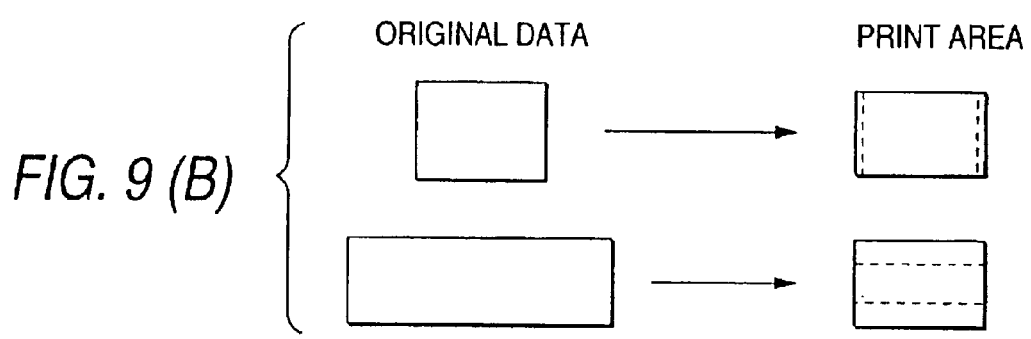
Figure 9:
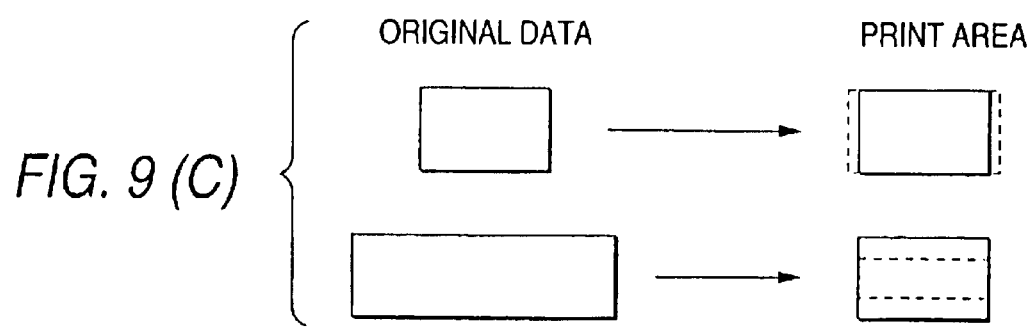

Some users may desire to print the entirety of the original data without trimming. In such a case, "NO TRIMMING" is selected on the screen shown in FIG. 8(r). As shown in FIG. 9(B), if the aspect ratio of the original data is smaller than that of the print area, the original data are printed such that the shorter sides of the original data match those of the print area. In contrast, if the aspect ratio of the original data is greater than that of the print area, the original data are printed such that the longer sides of the original data are matched with those of the print area. In this way, the entirety of the original data can be printed without trimming.

If a small difference exists between the aspect ratio of the original data and the aspect ratio of the print area, a small area is trimmed by means of standard trimming operation. However, if an attempt is made to print data pertaining to a panoramic image having a large aspect ratio, in the print area of a standard photo size, a large area of the original data is trimmed. In the present embodiment, so long as the user selects by clicking check boxes "STANDARD TRIMMING" and "AUTOMATIC PANORAMIC PRINTING OF PANORAMIC PICTURE," image data whose aspect ratio is greater than 1:2 are determined to correspond to a panoramic image. As shown in FIG. 9(C), a non-panoramic image is trimmed in the same manner as in FIG. 9(A), whereas a panoramic image can be printed without trimming, as in the case of the processing shown in FIG. 9(B). The user can cancel selection by clicking the check boxes once again.

Figure 10:
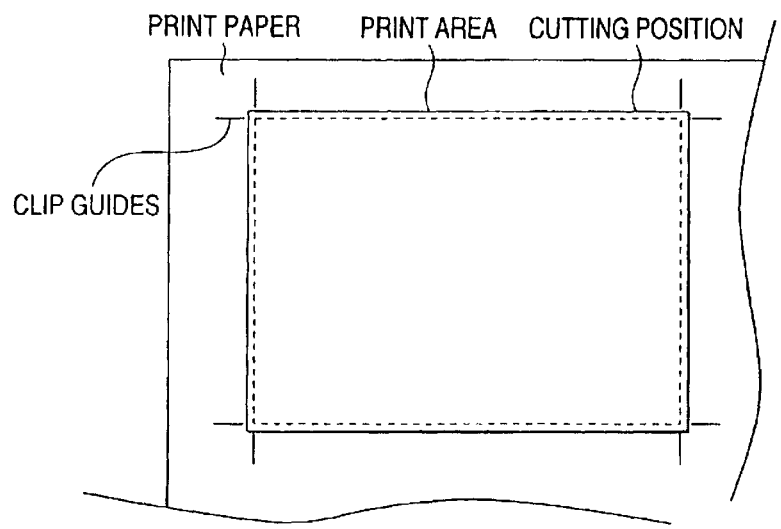
FIG. 10 is a descriptive view for describing the positions of clip guides according to the first embodiment.

On the screen shown in FIG. 8(r), the user can select whether to print clip guides. As shown in FIG. 10, the clip guides are printed outside the print area of a picture. For example, the clip guides are represented by horizontal lines having a length of 5 mm. The horizontal lines are 1 mm outside the vertical sides of the print area and are aligned with horizontal phantom lines running 1 mm inside the horizontal sides of the print area. Further, the clip guides comprise vertical lines having a length of 5 mm. The vertical lines are 1 mm outside the horizontal sides of the print area and are aligned with vertical phantom lines running 1 mm inside the vertical sides of the print area. After a picture is printed, the paper is cut along the clip guides, whereby the four sides of the print area are cut by one millimeter each. As a result, a picture having no margins can be produced. The clip guides are particularly useful for printing a picture on paper lacking perforations that conform to a photo print size.

In addition, the user can also select on the screen shown in FIG. 8(r) whether to print, together with a picture, the date of photo shooting, and the time of photo shooting.

In step S114, a screen shown in FIG. 8(s) appears on the monitor, and printing of a picture is commenced. A picture which is currently printed is displayed, along with a bar expressing the degree of progress of printing operation within the range from the start point to the end point. After commencement of printing, the bar representing the degree of progress of printing operation gradually becomes opaque from the left. When the entire bar becomes opaque, printing of all the pictures is completed. After completion of printing, processing returns to step S101.

In each of the selection screens, a label "RECOMMENDED" may be attached to any one of selection buttons, to thereby indicate an icon representing a recommended choice. By virtue of such an icon, even a beginner who is operating the print program for the first time can print pictures without fails and without interruption, thus involving occurrences which would otherwise be caused when a beginner is confused about which choices to select during the operation.

Figure 11:
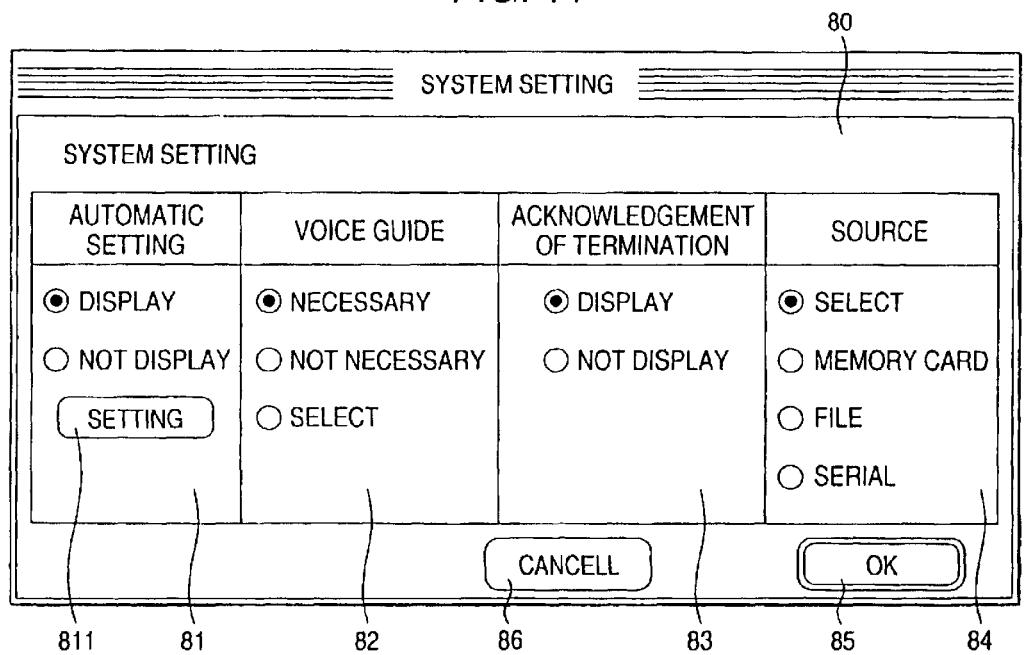
FIG. 11 shows a system setting screen according to the first embodiment.

In the present embodiment, when in step S101 the user clicks a plurality of predetermined positions on the start screen shown in FIG. 3(a) within a predetermined period of time, a system setting screen 80 such as that shown in FIG. 11 is displayed on the monitor 20 (step S115). For example, if the four corners of the screen are clicked in any sequence within five seconds, the system setting screen 80 is displayed. As a result, an ordinary user has no chance of calling the system setting screen 80 which is difficult to operate, and the system setting screen 80 is displayed only when the manager desires to perform detailed settings.

On the system setting screen 80 shown in FIG. 11, within a frame "AUTOMATIC SETTING:" 81 the user can set whether to display an automatic execution button in addition to the "START" button on the start screen. Further, within a "VOICE GUIDE:" frame 82 the user can set whether or not a voice guide for verbally describing operations is needed, as well as whether to perform selection by displaying the selection screen in a step prior to tep S102. Within a "TERMINATION ACKNOWLEDGEMENT:" frame 83 the user can set whether to terminate operation with display of a completion acknowledgement screen or without display of the same when the user clicks the "END" button appearing on the screens in step S102 to S114. Within a "SOURCE:" frame 84 the user can set whether to display a selection screen for selecting sources of data to be read in step S102 or to limit the source to a single source beforehand without display of the selection screen. When an "OK" button 85 is clicked, settings are changed, and the screen returns to the start screen. If a "CANCEL" button 86 is clicked, settings are retained, and the screen returns to the start screen.

When, within the "AUTOMATIC SETTING:" frame 81 appearing on the system setting screen, the user clicks the "SETTING . . . " button 811, an automatic setting screen 90 shown in FIG. 12 appears on the monitor. At this time, the user can set selection screens to be displayed after clicking of the automatic setting execution button appearing on the start screen and selection screens to be omitted, as well. Here, although the automatic setting execution button is labeled "DEFAULT BUTTON," the name assigned to the automatic setting execution button may be arbitrarily changed.

On the automatic setting screen 90, the user is provided with choices of voice guide, choices of sources for data to be read in step S102, choices as to whether to perform index printing in step S107, choices of photo selection methods in step S109, choices of print sizes in step S112, and choices as to whether to acknowledge a print in step S113 by way of various selections. Alternatively, the display of selection screens to the user may be omitted by limiting data to be selected in advance. For instance, so long as the user selects "SELECTION" in a "PHOTO SELECTION METHOD" frame 94 appearing on the automatic setting screen 90, when the user clicks the "DEFAULT BUTTON" on the start screen, a screen for selecting photo selection methods is displayed in step S109. Alternatively, so long as the user sets "ALL" within the "PHOTO SELECTION METHOD" frame 94, when the user clicks the "DEFAULT BUTTON" on the start screen, the print program is set such that single prints of all the pictures are produced at all times. Processing relating to step S109 is not executed, and the screen for selecting photo selection methods does not appear on the monitor.

If the user selects "ALL" or "DESIGNATED NUMBER OF PRINTS" as a photo selection method within a "DEFAULT NUMBER OF PRINTS" frame 95, the user can set the default number of prints which is to be set at the beginning.

If settings relating to the "VOICE GUIDE" and "SOURCES" performed in the automatic setting screen 90 differ from those performed in the system setting screen 80, the settings performed in the automatic setting screen 90 take priority.

When the user clicks an "OK" button 98 on the automatic setting screen 90, the changed settings are saved, and the screen returns to the system setting screen 80. When the user clicks a "CANCEL" button 99, the changed settings are reset, and the screen returns to the system setting screen 80.

As shown in, e.g., FIG. 12, so long as the user sets on the previously-mentioned automatic setting screen that the memory card is always used as the source from which data are to be read, index printing is omitted, and single prints of all pictures are to be printed in size 4×6 on 4×6-size paper, all the processing is executed in response to the user clicking only the "DEFAULT BUTTON" on the start screen in step S101 and inserting only the memory card, whereby all pictures stored in the memory card are printed. Thus, the user's operation is greatly simplified. Alternatively, so long as the user sets that index printing is performed and that the default number of prints of all the photo selection methods is 0, all the processing is effected in response to the user clicking only the "DEFAULT BUTTON" on the start screen in step S101 and inserting the memory card, whereby index prints of the pictures stored in the memory card are produced. Accordingly, the user's operation is greatly simplified.

B. Second Embodiment

Figure 13:
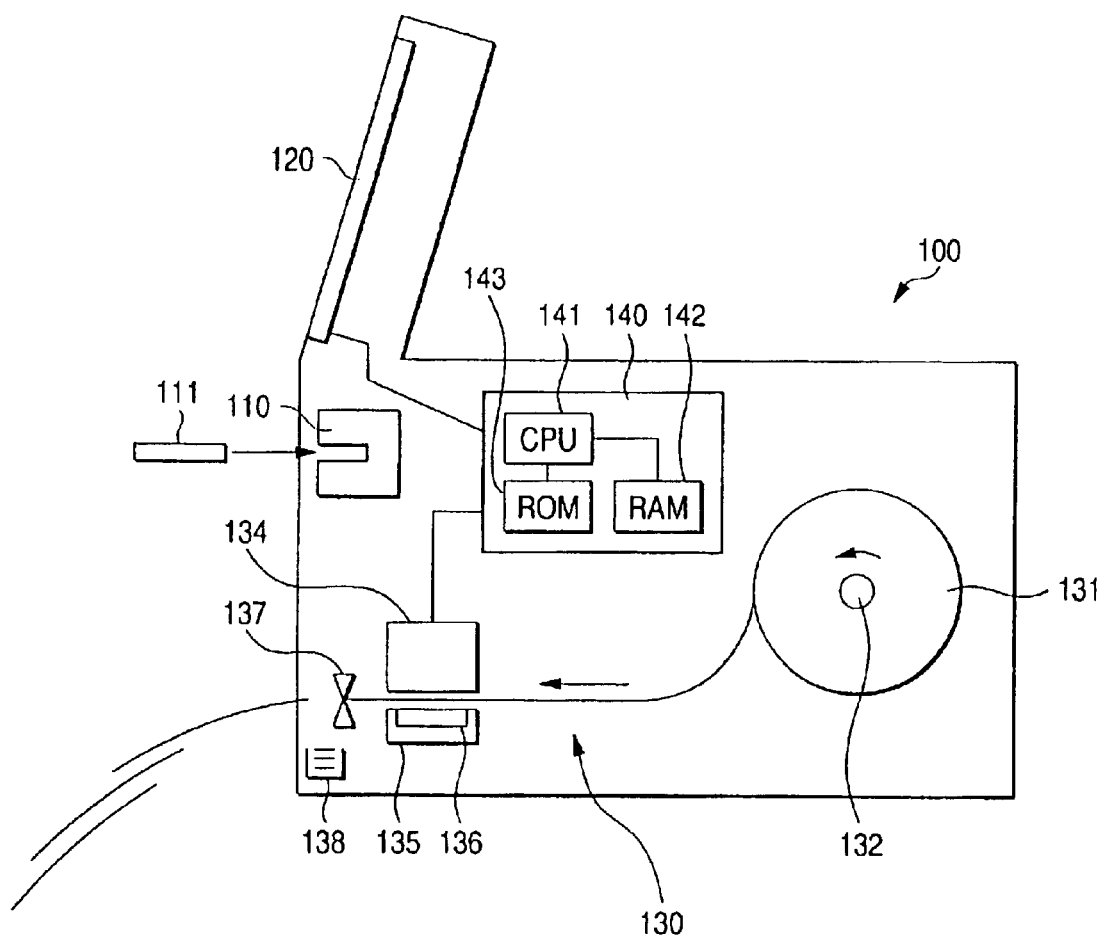
FIG. 13 is a block diagram schematically showing a photographic image print system according to a second embodiment of the present invention.
Figure 14:
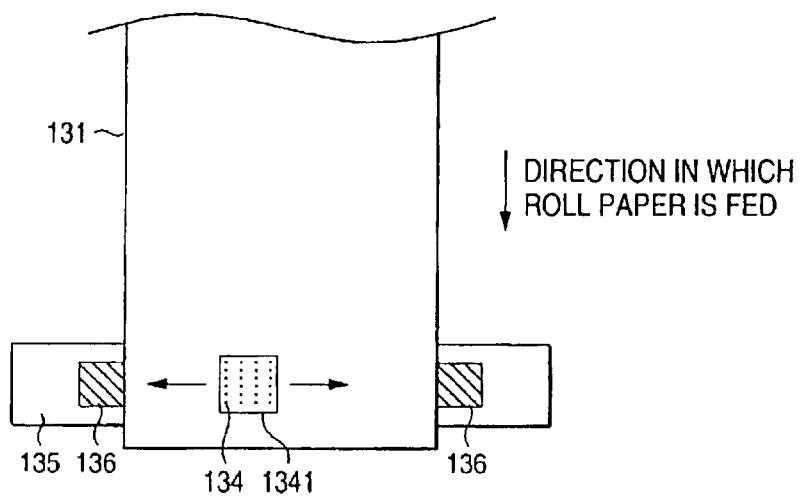
FIG. 14 is a diagrammatic representation for describing the operation of a print section according to the second embodiment.

FIG. 13 is a block diagram schematically showing a photographic image print system according to a second embodiment of the present invention.

A photographic data print system 100 comprises a card slot 110 serving as a connection section for receiving a storage medium; a touch panel 120; a print section 130; and a control section 140.

A memory card (PC card) 111 which conforms to PCM-CIA standards and serves as a storage medium can be inserted into the card slot 110. A compact flash (trademark of Sun Disk Co., Ltd.) card, a memory card conforming to SSFDC standards [Smart Media (trademark)], or a like card can be inserted into the card slot 110 by way of an adapter. The photographic data print system may be equipped with a plurality of types of card slots so as to be able to cope with numerous types of memory cards.

On a touch panel 120, a touch key serving as an input section is labeled on the surface of a liquid crystal display (LCD) serving as a display section. When the user presses the touch key, a control section 140 can detect a location on the touch key where the user presses. For instance, a matrix-type touch key, which is formed by superimposing a panel having a plurality of horizontal electrodes provided thereon on another panel having a plurality of vertical electrodes provided thereon, may be employed as the touch key. A voltage is applied to either the horizontal or vertical electrodes. In response to the user pressing the surface of the touch key, an electric current flows to the remaining electrode. The location on the surface of the touch panel 120 where the user touches can be detected by sensing the electric current.

The print section 130 rotatably supports roll paper 131 by means of a shaft 132. The roll paper 131 is rotated so as to be fed outside by means of unillustrated paper feed means. As shown in FIG. 13, an ink-jet head 134 can travel back and forth in a direction orthogonal to the direction in which the roller paper 131 is fed, in other words, in the transverse direction of the roller paper 131 while being parallel with the surface of the roller paper 131, specifically, the ink-jet head 134 can squirt ink droplets to the roll paper 131 while traveling back and forth over the roll paper 131 in the transverse direction thereof. A paper guide 135 is disposed so as to face the ink-jet head 134 such that the roll paper 131 is interposed therebetween. Absorption pads 136 are provided on the paper guide 135 so as to correspond to opposite ends of the range of movement of the ink-jet head 134, thus acting as ink absorbing means for absorbing ink droplets squirted outside the roll paper 131.

The ink-jet head 134 can enlarge and reduce the volume of an ink chamber by application of a voltage to pressure generation means in response to a drive signal received from a control section 140, to thereby squirt, by way of nozzles, the ink stored in the ink chamber to the roll paper 131 as droplets. The ink-jet head 134 comprises four color ink tanks; namely, a cyan (C) ink tank, a magenta (M) ink tank, a yellow (Y) ink tank, and a black (K) ink tank, and a plurality of nozzles 1341 which are provided for each of the four colors and are arranged at right angles to the direction of movement of the ink-jet head 134, wherein each nozzle comprises four rows of nozzles 1341. A color image can be printed by combination of four inks; C, M, Y, and K. At the time of producing a black print by superimposing the inks C, M, and Y one on another, an ink K may be omitted. Smoother gradations can be expressed by use of six inks; that I, a dark cyan (C) ink, a dark magenta (M) ink, a light cyan (c) ink, a light magenta (m) ink, a yellow (Y) ink, and a black (K) ink. Particularly in a flesh-colored area having a high lightness of color, dots of ink droplets can be made unnoticeable.

Figure 15:
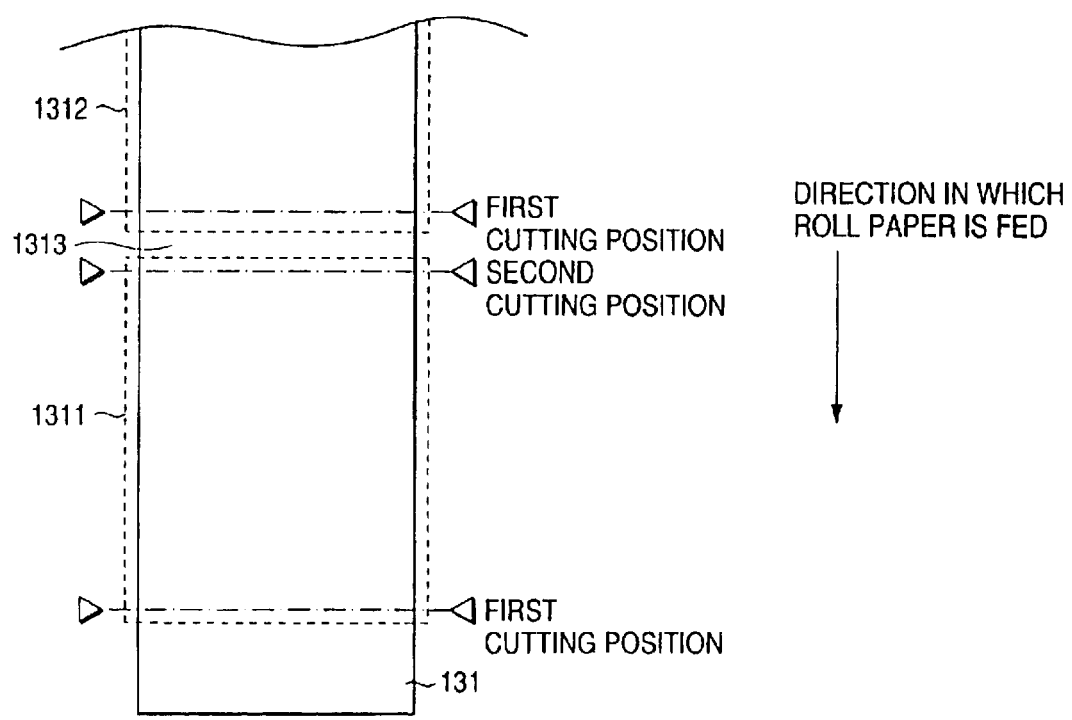
FIG. 15 is a diagrammatic representation for describing the positional relationship between an ink squirt region and roll paper according to the second embodiment.

A cutter 137 serving as cutting means is disposed so as to cut the roll paper 131 in the transverse direction, downstream of the ink-jet head 134 with respect to the direction of movement of the roll sheet 131. In response to an instruction issued by the control section 140, the cutter 137 cuts the roll sheet 131 in the transverse direction. As shown in FIG. 15, the roll paper 131 is divided into an ink squirt region 1311 where ink droplets are to be squired to produce a print of a single picture and another ink squirt region 1312 where ink droplets are to be squirted to produce a print of a subsequent picture. A margin 1313 between the ink squirt regions 1311 and 1312 is cut by the cutter 137 and falls to a waste paper accumulation section 138. The roll paper 131 is cut along first and second cutting positions inside the respective ink squirt regions 1311 and 1312 in the longitudinal direction. The ink squirt regions 1311 and 1312 are slightly wider than the roll paper 131 (by, for example, 1 mm). Accordingly, the thus-produced print of the picture has no margins. The roll paper 131 on which a picture is printed is discharged outside a paper outlet 1392.

The control section 140 comprises a central processing unit (CPU) 141, RAM 142 serving as a primary storage device, and a storage medium having a control program stored thereon, such as ROM 143 and flash memory. The control section 140 displays, on the touch panel 120, photographic data stored in the memory card 111 inserted in the card slot 110, determines an input entered by way of the touch panel 120, and produces prints of pictures by means of the print section 130.

In the present embodiment, a print instruction is issued in the same manner as shown in FIG. 1 in connection with the first embodiment, by means of the control program stored in the ROM 143 of the control section 140. The screens such as those shown in FIGS. 3 through 8 appear on the LCD of the touch panel 120. Processing similar to the processing, which is performed in the first embodiment when the mouse is clicked while a pointer is superimposed on the icon, can be effected in response to the user touching the surface of the touch panel 120.

In the present embodiment, the roll paper 131 having a width of 89 mm, a width of 102 mm, or a width of 127 mm is loaded in the print section 130. In step S112, the user can select a print size by pushing one of a plurality of buttons representing choices displayed on the LCD of the touch panel 120, in accordance with the width of the roll paper 131 loaded in the print section.

In a case where the roll paper 131 having a width of 89 mm is loaded in the print section, a print of a picture substantially equal in size to a name card (55×89 mm) can be printed by cutting the roll paper 131 to a length of 55 mm. In this case, if the roll paper 131 is cut to a length of 127 mm, a print of an L-sized substantially-standard picture (89×127 mm) can be produced.

In a case where the roll paper 131 having a width of 102 mm is loaded in the print section, a print of a picture substantially equal in size to a substantially-standard postcard or a substantially-standard photograph produced in Europe (102×152 mm) can be printed by cutting the roll paper 131 to a length of 152 mm.

In a case where the roll paper 131 having a width of 127 mm is loaded in the print section, a print of a picture substantially equal in size to a substantially-standard L-size photograph (89×127 mm) can be printed by cutting the roll paper 131 to a length of 89 mm. If a print of a picture is printed while the width of the roll paper 131 is taken as a shorter side, a larger print of the picture may be produced.

In any one of the foregoing cases, a print of a picture can be produced at various aspect ratios; such as a print having an aspect ratio of 4:3 conforming to the number of pixels output by a common digital still camera, a square print, or a panoramic print whose length is twice or more the width of the roll paper 131.

Figure 16:
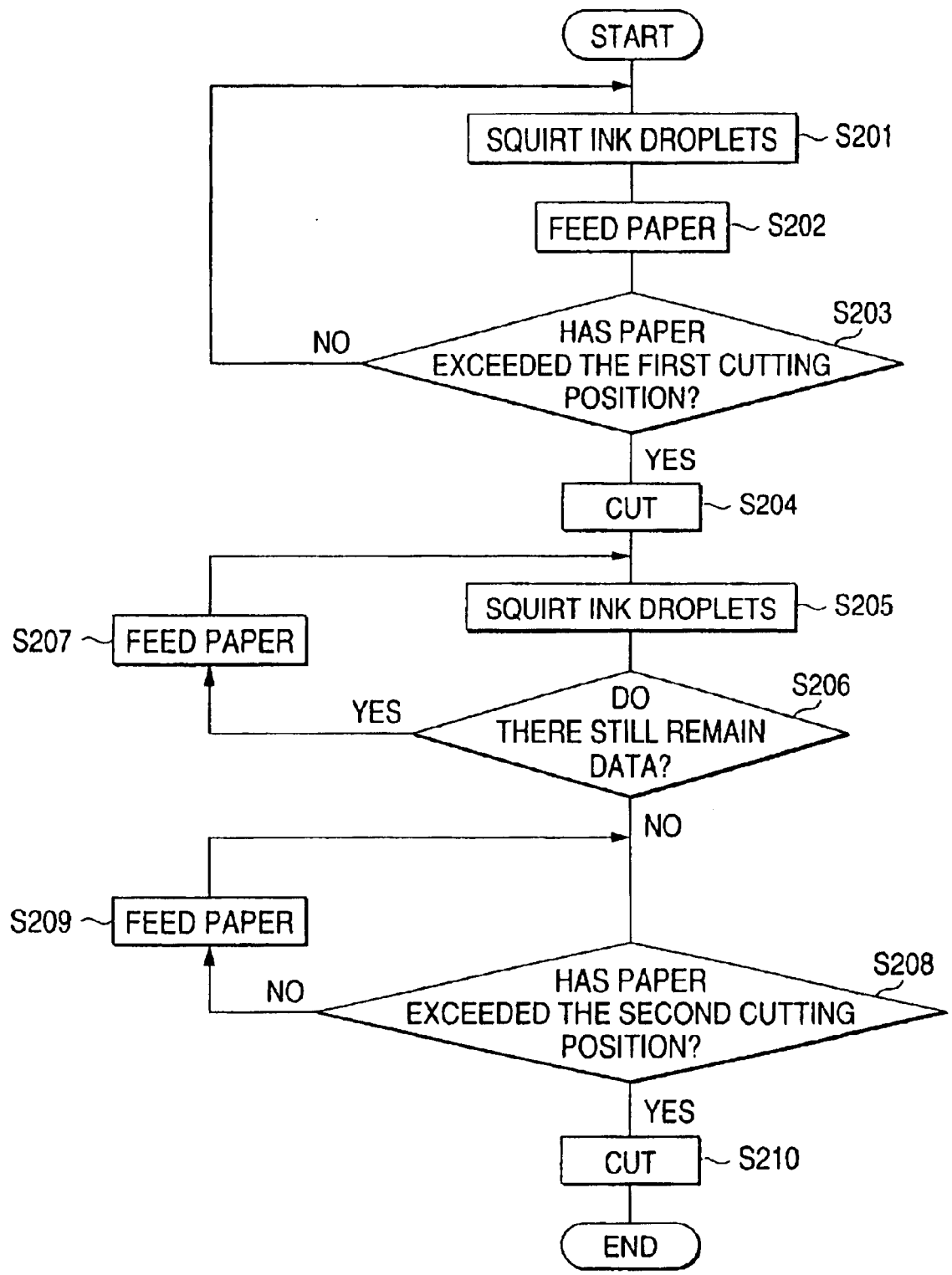
FIG. 16 is a flowchart showing procedures for performing printing operation according to the second embodiment.

FIG. 16 is a flowchart showing processes of producing prints of pictures.

When printing of pictures is commenced, the ink-jet head 134 squirts ink droplets in response to the drive signal issued by the control section 140 while traveling over the roll paper 131 in the transverse direction, thereby printing an image on the roll paper 131 (S201). The ink-jet head 134 can squirt ink droplets outside the width of the roll paper 131. In the present embodiment, ink droplets are squirted out to 1 mm outside the opposite sides of the roll paper 131 in the widthwise direction. The ink droplets squirted outside the roll paper 131 are absorbed by the absorbing pad 136 serving as ink absorbing means.

Next, the roll paper 131 is fed by only the amount corresponding to the length over which the nozzles 1341 for each color are arranged on the ink-jet head 134 (S202). A determination is made as to whether or not the leading end of the ink squirt region 1311 on the roll paper 131 shown in FIG. 15 has exceeded the position of the cutter 137 (S203). If the leading end has exceeded the position of the cutter 137, the roll paper 131 is cut by the cutter 137 (S204). If the leading end has not exceeded the position of the cutter 137, processing returns to processing relating to S201, and printing operation is continued.

The position on the roll paper where the paper is cut in step S204 corresponds to the first cutting position. Even after the roll paper 131 has been cut in step S204, an image is printed on the roll paper 131 by means of the ink-jet head 134, as in the case of processing relating to step S201 (S205).

In step S208, a determination is made as to whether or not the trailing end of the ink squirt region 1311 on the roll paper 131 has exceeded the position of the cutter 137 during the next paper feeding action (S209). If the tail end has exceeded the position of the cutter 137, the roll paper 131 is cut by the cutter 137. The cutting position corresponds to the second cutting position.

During the processing relating to steps S201 to S210, the print section 130 prints images on the roll paper 131 and cut the thus-printed portions into prints, thereby producing single pictures having no margins.

So long as the user sets on the automatic setting screen described in connection with the first embodiment by reference to FIGS. 11 and 12 that, as shown in FIG. 12, the memory card is always used as the source from which data are to be read, index printing is omitted, and single prints of all pictures are to be printed in size 4×6 on 4×6-size paper, all the processing is executed in response to the user clicking only the "DEFAULT BUTTON" on the start screen in step S101 and inserting only the memory card, whereby all pictures stored in the memory card are printed. Thus, the user's operation is greatly simplified. Alternatively, so long as the user sets that index printing is performed and that the default number of prints of all the photo selection methods is 0, all the processing is effected in response to the user clicking only the "DEFAULT BUTTON" on the start screen in step S101 and inserting the memory card, whereby index prints of the pictures stored in the memory card are produced. Accordingly, the user's operation is greatly simplified.

Although only two embodiments of the present invention have been described, the present invention is not limited to these embodiments. Needless to say, the present invention can be subjected to various modifications.

Industrial Applicability

In a photographic image print system or a computer-readable storage device having a photographic image print program stored thereon according to the present invention, display of at least one of processing selection screens can be set so as to be omitted, thereby simplifying the user's operation.

Data to be selected are set beforehand on the processing selection screen. Hence, in a case where same operations are continuously performed, the same operations are not necessarily performed repeatedly, thus simplifying the user's operation.

For example, if the print system is set beforehand such that single prints of pictures are to be printed in predetermined sizes, a predetermined image can be printed without involvement of selection on the processing selection screen, thereby simplifying a photographic image printing operation.

A photographic image printer according to the present invention enables determination of a picture to be printed by input means specified by the user. Accordingly, a picture can be printed through a simple operation. Further, the printing operation can be simplified.

Since the user can print all pictures by entering directions by way of first input means, pictures can be printed through a simple operation. Further, the operation for printing a picture can be simplified.

Since the user can print index images by entering instructions by way of second input means, index images can be printed through a simple operation. An operation for printing index images can be simplified.

What is claimed is:

1. A computer-readable storage medium having a photographic image print program stored thereon, the program comprising instructions to perform operations, comprising:
   reading photographic image data from a memory;
   detecting a pressed position on a display;
   printing one or more photographic images based on the photographic image data;
   displaying, on the display, at least some of a plurality of processing selection screens in a predetermined sequence, at least one of said processing selection screens having a plurality of processing selection buttons;
   selecting one of the processing selection buttons based on the pressed position;
   performing processing corresponding to the selected processing selection button; and
   selectively omitting display of at least one of the plurality of processing selection screens based on the processing selection button.

2. A storage medium according to claim 1, the program comprising instructions to perform operations, further comprising setting, beforehand, data to be selected on the plurality of processing selection screens.

3. A storage medium according to claim 1, wherein at least one of the processing selection screens provides a choice of pictures to be printed, a choice about a number of prints to be printed, or a choice about the size of a print to be printed.

4. A storage medium according to claim 2, wherein at least one of the processing selection screens provides a choice of pictures to be printed, a choice about a number of prints to be printed, or a choice about the size of a print to be printed.

5. A storage medium according to claim 3, wherein at least one of the processing selection screens provides a plurality of choices of optional print settings.

6. A storage medium according to claim 1, the program comprising instructions to perform operations, further comprising setting one or more optional print settings prior to the printing of the one or more photographic images.

7. A storage medium according to claim 6, wherein the one or more optional print settings includes adding at least one of a date and a time that a photographic image was taken to the corresponding one or more photographic images.

8. A storage medium according to claim 6, wherein the one or more optional print settings includes specifying trimming options for the one or more photographic images.

9. A storage medium according to claim 6, wherein the one or more optional print settings includes adding clip guides to the one or more photographic images.

10. A storage medium according to claim 6, wherein the one or more optional print settings includes a plurality of panoramic printing options.

11. A storage medium according to claim 1, the program comprising instructions to perform operations, further comprising indicating one or more selection buttons representing a recommended choice to a user.

12. A storage medium according to claim 1, the program comprising instructions to perform operations, further comprising setting one or more default print settings.

13. A storage medium according to claim 12, wherein the one or more default print settings includes specifying a source of the photographic image data to be read.

14. A storage medium according to claim 12, wherein the one or more default print settings includes specifying whether to perform index printing.

15. A storage medium according to claim 12, wherein the one or more default print settings includes specifying at least one of a default manner of selecting the one or more photographic images, a default number of prints, and a default size of prints.

16. A storage medium according to claim 12, the program comprising instructions to perform operations, further comprising detecting an input of a special input sequence;
   wherein the operation of setting one or more default print settings can only be accessed upon entry of the special input sequence.

17. A storage medium according to claim 12, the program comprising instructions to perform operations, further comprising providing help to a user concerning a specified operation or option of the program.

18. A storage medium according to claim 1, wherein the program can be provided to a computer over a network.

19. A storage medium according to claim 18, wherein the network is the Internet.

20. A storage medium according to claim 1, wherein the program is stored in a location different from a location of a computer running the program.

21. A computer-readable storage medium having a photographic image print program stored thereon, the program comprising instructions to perform operations, comprising:
   reading photographic image data from a storage means;
   detecting an arbitrary position on a display means;
   printing one or more photographic images, based on the photographic image data, using a print means;
   displaying, on the display means, a plurality of processing selection screens in a predetermined sequence, at least one of said processing selection screens having a plurality of processing selection buttons;

selecting a type of print processing by activating at least one of the processing selection buttons; and selectively omitting display of at least one of the plurality of processing selection screens based on the activated processing selection buttons.

22. A storage medium according to claim 21, wherein the display means is a liquid crystal monitor.

23. A storage medium according to claim 21, wherein the display means is a touch panel device.

24. A storage medium according to claim 21, wherein the storage means is a card for storing data.

25. A computer-readable storage medium having a photographic image print program stored thereon, the program comprising instructions to perform operations, comprising:

reading photographic image data from a memory;

detecting a pressed position on a display;

printing one or more photographic images based on the photographic image data;

displaying, on the display, at least some of a plurality of processing selection screens in a predetermined sequence, at least one of said processing selection screens having a plurality of processing selection buttons;

verbally instructing a user concerning the operations and options of the program;

selecting processing corresponding to the processing selection button pressed based on the pressed position; and selectively omitting display of at least one of the plurality of processing selection screens based on the pressed processing selection button.

* * * * *